Dec. 20, 1960     N. CORSINI     2,964,861
WEIGHT TRANSFER DEVICE

Filed Nov. 14, 1957     2 Sheets-Sheet 1

INVENTOR.
Neo Corsini
BY
Attorneys

Dec. 20, 1960   N. CORSINI   2,964,861
WEIGHT TRANSFER DEVICE
Filed Nov. 14, 1957   2 Sheets-Sheet 2
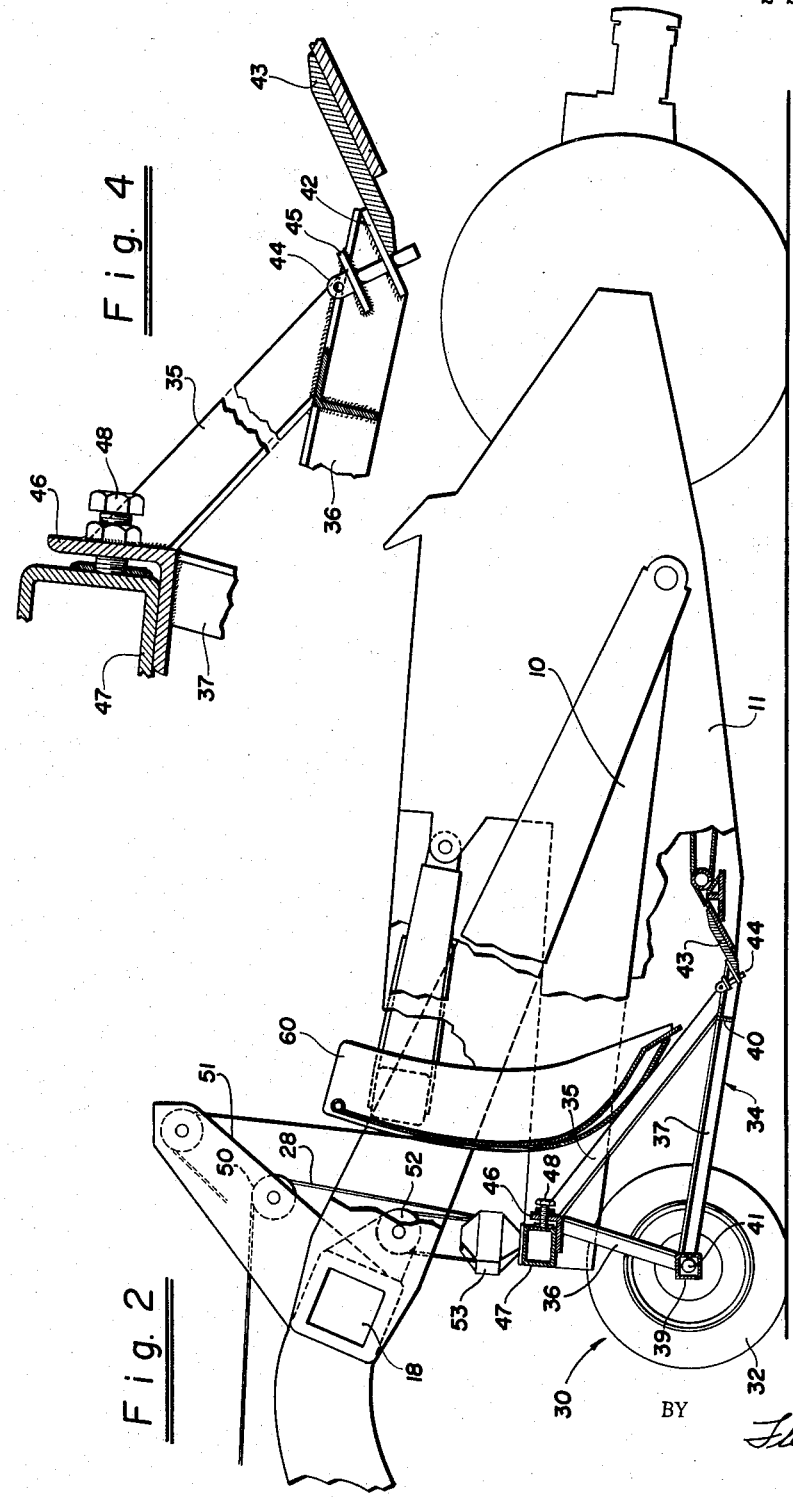
INVENTOR.
Neo Corsini
BY
Flehr and Swain
Attorneys United States Patent Office 2,964,861
Patented Dec. 20, 1960

2,964,861

WEIGHT TRANSFER DEVICE

Neo Corsini, Sunnyvale, Calif., assignor, by mesne assignments, to Curtiss-Wright Corporation, South Bend, Ind.

Filed Nov. 14, 1957, Ser. No. 696,458

3 Claims. (Cl. 37—126)

This invention relates generally to a load distributing attachment for use with heavy duty vehicles, as for example, earth movers of the type disclosed in Clark Reissue 23,251, Wooldridge 2,262,310, and Berner 2,318,190.

The highway laws of most states prescribe load limit regulations which must be complied with before travel on the highway is permitted. In general, the laws regulate permissible axle loads for heavy duty vehicles, designed to prevent cracking or damage to the highway. Earth movers and similar heavy duty vehicles conceived primarily for off-highway operations frequently are unable to comply with highway load limits, even in unloaded condition. A problem arises therefore when it is desired to move such equipment over the highways during operations, or from one job to the next. In the latter instance, shipment by rail or boat is sometimes necessitated, at considerable additional expense. The problem is complicated by the many variations in state regulations.

It is a general object of the present invention to provide an attachment for use with vehicles of the above character by which the weight of a vehicle may be distributed uniformly over the highway in compliance with highway regulations.

Another object of the invention is to provide a load distributing attachment including auxiliary wheels by which a predetermined proportion of the total weight can be uniformly distributed or transferred to such wheels.

Another object is to provide a load distributing attachment of the above type by which the proportion of weight transferred to the attachment can be varied, as may be necessary during maneuvering or under certain road conditions.

Additional objects and features of the invention will appear from the following description in which a preferred embodiment of the invention has been set forth in detail in conjunction with the accompanying drawing.

Referring to the drawing:

Figure 2 is an enlarged fragmentary view in section and in elevation of trailer portions of the vehicle of Figure 1, showing details of the attachment device.

Figure 4 is a greatly enlarged fragmentary view in vertical section along the line 4—4 of Figure 3.

Earth moving machines of the carrier scraper type generally make use of a main bowl having a forward cutting blade, mounted on a wheeled frame in such a manner that it can be adjusted relative to its height, and traversed over a ground surface for digging, carrying and filling or spreading operations. In a typical rig, the main frame carrying the bowl is pivotally mounted on a pair of rear carrying wheels and is supported at its forward end by a pair of front wheels coupled to or forming part of a separate tractor providing the motive force. In accordance with the present invention, a weight distributing device is provided for attachment to the main frame of the trailer in such a manner that a predetermined portion of the total load may be transferred from the rear and front carrying wheels to the weight distributing device. Moreover the present invention takes advantage of the hoist normally provided for adjusting the height of the scraper blade and bowl to regulate the proportion of load transferred to the weight distributing attachment.

Figure 1:
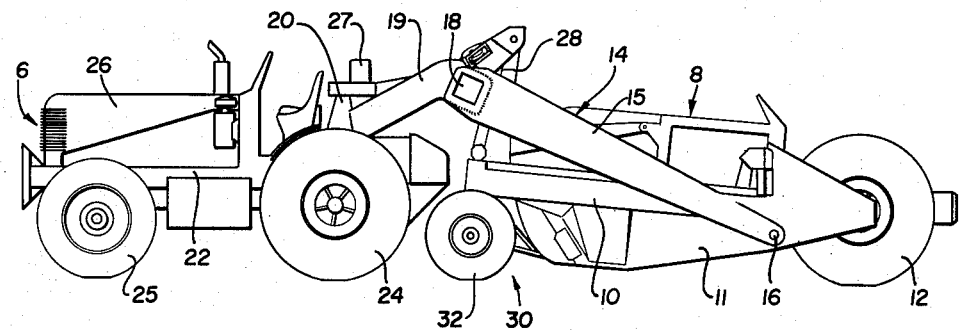
Figure 1 is a side elevational view of a heavy duty vehicle incorporating a weight distributing attachment embodying the invention.

Figure 1 illustrates my invention as particularly adapted to a heavy duty land vehicle of the carrier-scraper type, for example, one having a forward motor powered tractor 6 and a rear trailer unit 8 coupled to the frame of the tractor by means of a kingpin assembly. For simplicity only certain parts of the tractor and trailer are shown. Number 10 represents the main trailer frame to which are secured the scraper or bowl unit 11 and a pair of rear carrying wheels 12. The main frame includes a yoke 14 having side arms 15 extending along the sides of the bowl and pivotally secured at 16 and a forward cross connecting beam 18. A gooseneck 19 is attached to the center of the cross connecting beam and extends to the kingpin assembly 20. The kingpin assembly 20 serves to couple the tractor and trailer for steering movements about a vertical axis, and is usually mounted on a cradle unit that permits the tractor to oscillate about a horizontal axis, for example, as disclosed in Clark Reissue 23,251.

The tractor unit 6 comprises a supplemental truck frame 22 mounted on pairs of front carrying wheels 24 and 25, and a motor 26 carried by the truck frame and connected to drive the front wheels. Means for raising and lowering the bowl unit 11 between earth digging, carrying, or discharging positions are generally provided and usually consist of a winch on the tractor which operates a cable or hoist 28 reeved through sheaves carried by the yoke and bowl portions of the trailer main frame.

It will be understood that in carrying operations the weight of the trailer unit is distributed over both the rear carrying wheels 12 and the front carrying wheels 24, a substantial part of the bowl load being transferred to the front wheels during carrying operations by the cable 28. Since the truck frame 22 also carries the weight of the motor and steering mechanism, a condition of severe overloading frequently occurs at the front wheels 24.

Figure 3:
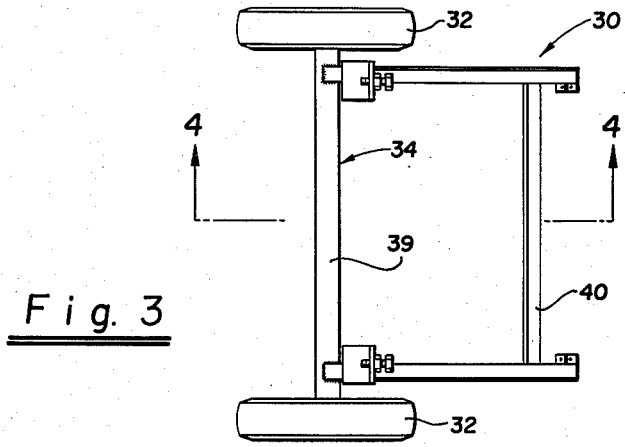
Figure 3 is a view of the attachment device in plan.

In accordance with the present invention such an overload condition is alleviated by attachment of a novel, effective weight distributing or transfer device 30 to the forward end of the main frame 10 of the trailer unit. As is particularly illustrated in Figures 2 and 3 such device preferably includes a pair of auxiliary wheels 32 rigidly attached to the pivoted bowl portion of the main frame 10 of the trailer by means of a separate dolly frame 34. This dolly frame may comprise a pair of triangular side frames, including the members 35, 36, and 37, and lower cross bracing members 39 and 40. Stub shafts 41 journalling the wheels 32 are carried by the cross member 39.

To facilitate the attachment of the transfer dolly 30 to the main frame, I prefer to employ abutment members 42 (Fig. 4) extending transversely and at an angle to the side frames 36, and adapted to engage the scraper blade 43 of the bowl unit. The members 42 are apertured so that the pins 44 extending down through the apertures, and through upper guide brackets 45 will rigidly project from the abutment members and into engagement with the forward edge of the scraping blade. Angle brackets 46, dimensioned to receive a forward cross beam 47 of the bowl frame, are secured to the side frames at the point of juncture of the members 35 and 36. These angle brackets can carry clamping elements, such as the threaded cap screws 48, adapted to be tightened against beam 47. It will be understood that no cross bracing is provided between the angle brackets 46 so as to not interfere with the movement of the pivoted loading apron 60 normally provided at the forward end of the main bowl 11.

With a dolly structure as described, the dolly 30 can be backed into position until the abutment plates 42 and the pins 44 firmly engage the scraper blade of the bowl unit. The cable 28 can then be operated to lower the bowl unit, causing the cross beam 47 to engage the angle brackets 46. Upon tightening the cap screws 48 the dolly unit is rigidly secured in position for subsequent carrying operations. To remove the dolly the operation is reversed: the screws 48 being loosened, the bowl unit hoisted slightly by the cable 28, and the dolly unit rolled forward out of engagement with the scraper blade.

The cable 28 for raising and lowering the main bowl with respect to the yoke is connected to a winch drum 27 carried by the tractor and extends rearwardly over the customary fair lead sheave to the sheave 50 which is carried by the stud beam 51. From sheave 50 the cable 28 extends downward and is reeved over the sheave of the blocks 52 and 53 to be finally anchored to the beam 18, for example, as in Richter 2,687,584. It will be understood that when the cable 28 is pulled or played out by the winch drum to which it is attached, the main bowl 11 and cutting blade 43 are raised or lowered to a desired position.

Figure 5:
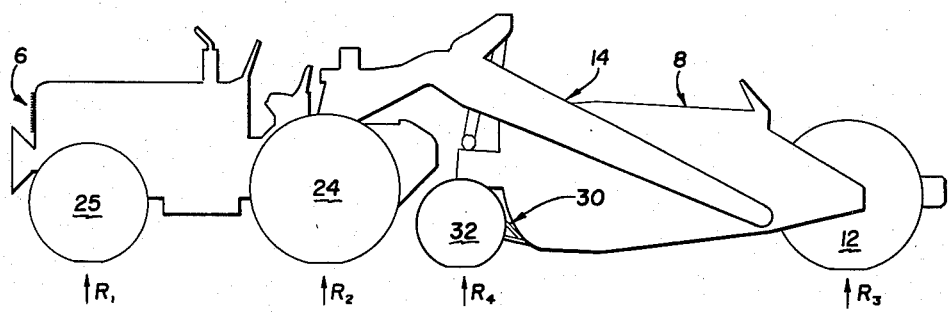
Figure 5 is a schematic view representing the weight distribution possible in accordance with the invention.

In general, prior to movement on the highway, the cable 28 is operated to hoist the bowl as necessary to permit attachment of the weight transfer dolly 30. Upon subsequently playing out the cable 28, a substantial portion of the load is transferred to the auxiliary wheels 32 of the dolly, which in turn act to apply an upwardly directed force at the forward end of the bowl unit tending to lighten the load on the front carrying wheels 24. This fact ban be demonstrated by reference to Figure 5 and Table I which exemplify the practice of the invention. In the table, the first set of figures are representative of loads normally applied by the carrying wheels of a typical rig to the road surface. The second set of figures indicates a redistribution of such loads possible by use of the weight transfer dolly 30 (assumed dead weight—5,400 pounds).

*Table I*

| Unit Only | Resultant Load in Pounds | | | | |
|---|---|---|---|---|---|
| | $R_1$ | $R_2$ | $R_3$ | $R_4$ | Total |
| Condition: | | | | | |
| (a) without dolly | 13,250 | 27,100 | 21,650 | | 62,000 |
| (b) with dolly | 12,800 | 22,600 | 19,200 | 12,800 | 67,400 |

In a general carrying use, it is contemplated that the transfer dolly 30 will support the entire weight normally transferred to the carrying wheels by the cable 28. At times however it may be desirable to remove all or a portion of the load from the dolly 30; for example, during sharp turns or other maneuvering. In such event, the cable 28 can be operated to raise the bowl unit and dolly, and the unit operated with the dolly in raised position until the maneuver has been completed. The dolly can then be lowered to again provide the desired weight distribution. It will be evident therefore that the dolly 30 and cable 28 together provide a unique means for both proportioning the weight transferred to the front and rear carrying wheels as well as facilitating maneuvering.

The preceding description of the preferred embodiment has related to a four-wheeled tractor attachment used in conjunction with a scraper type load carrier employing only rear carrying wheels. It will be undersood however that the invention is not limited to this particular arrangement, and that a two-wheeled tractor attachment of the type disclosed in Clark Reissue 23,251 or a scraper unit employing a pair of front steerable wheels in the position of the wheels 24, illustrated, might also be employed with equal success.

I claim:

1. A load carrying vehicle, comprising; a tractor member having load bearing traction wheels, a rear wheeled trailer member universally connected to said tractor member, said trailer member including a main frame assembly including a pivotal bowl portion having a forwardly disposed cross beam and a lower and rearwardly disposed scraper blade, and weight transfer means removably provided between said tractor and trailer members for relieving the load on said load bearing tractor wheels as required, said weight transfer means including a pair of interconnected subframes having load bearing wheels provided thereon and readily received in locked wedging engagement between said cross beam and scraper blade of said main frame assembly.

2. A load carrying vehicle, comprising; a tractor member having load bearing traction wheels, a rear wheeled trailer member universally connected to said tractor member, said trailer member including a main frame assembly including a pivotal bowl portion having a forwardly disposed cross beam and a lower and rearwardly disposed scraper blade, and weight transfer means removably provided between said tractor and trailer members for relieving the load on said load bearing tractor wheels as required, said weight transfer means including a dolly frame including triangular side members received in locked wedging engagement between said cross beam and said scraper blade, said frame having load wheel supporting axle means provided at and across the forwardly disposed end thereof.

3. A load carrying vehicle, comprising; a tractor member having load bearing traction wheels, a rear wheeled trailer member universally connected to said tractor member, said trailer member including a main frame assembly including a pivotal bowl portion having a forwardly disposed cross beam and a lower and rearwardly disposed scraper blade, and weight transfer means removably provided between said tractor and trailer members for relieving the load on said load bearing tractor wheels as required, said weight transfer means including a dolly frame comprising wheel supporting axle means including rearwardly disposed scraper blade engaging arms and vertically disposed support arms engageable with said bowl cross beam, and wedging truss supports provided between said blade and beam engaging arms and received in locking wedged engagement between said scraper blade and bowl cross beam.

References Cited in the file of this patent
UNITED STATES PATENTS

| | | |
|---|---|---|
| 2,266,913 | Simmons | Dec. 23, 1941 |
| 2,789,377 | Armington | Apr. 23, 1957 |